(12) United States Patent
Brezger

(10) Patent No.: US 11,846,324 B2
(45) Date of Patent: Dec. 19, 2023

(54) PAWL FREEWHEEL

(71) Applicant: BorgWarner Inc., Auburn Hills, MI (US)

(72) Inventor: Friedrich Philipp Brezger, Karlsruhe (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/305,096

(22) Filed: Apr. 21, 2023

(65) Prior Publication Data

US 2023/0341012 A1 Oct. 26, 2023

(30) Foreign Application Priority Data

Apr. 23, 2022 (DE) .......................... 102022001398.3

(51) Int. Cl.
*F16D 41/16* (2006.01)

(52) U.S. Cl.
CPC .................................... *F16D 41/16* (2013.01)

(58) Field of Classification Search
CPC ......... F16D 41/00–16; F16D 2023/123; F16D 2023/126
See application file for complete search history.

(56) References Cited

U.S. PATENT DOCUMENTS

| 9,810,272 | B1* | 11/2017 | Johnson | F16D 41/063 |
| 10,006,507 | B2 | 6/2018 | Lee et al. | |
| 2017/0343061 | A1* | 11/2017 | Campton | F16D 41/16 |
| 2018/0347642 | A1* | 12/2018 | Kimes | F16D 41/16 |
| 2020/0248762 | A1* | 8/2020 | Burke | F16D 41/14 |

FOREIGN PATENT DOCUMENTS

DE 112015001203 T5 12/2016

* cited by examiner

*Primary Examiner* — Ernesto A Suarez
*Assistant Examiner* — Lillian T Nguyen
(74) *Attorney, Agent, or Firm* — Howard & Howard Attorneys PLLC

(57) ABSTRACT

A pawl freewheel with a first race, a second race and pawls between the first and second race, which comprise at least one first pawl, which can be pivoted between a locked position in which the first race is rotationally drivingly coupled in a first direction of rotation relative to the second race via the first pawl to the second race and an open position, in which the first race is rotatable in the first direction of rotation relative to the second race wherein an actuating device is provided with an actuating pin which interacts with the first pawl which can be displaced from a first actuating position in which the first pawl is pivoted into the locked position, in the axial direction relative to the first pawl into a second actuating position, in which the first pawl is pivoted into the open position.

20 Claims, 3 Drawing Sheets

PAWL FREEWHEEL

CROSS-REFERENCE TO RELATED APPLICATIONS

Figure 1:
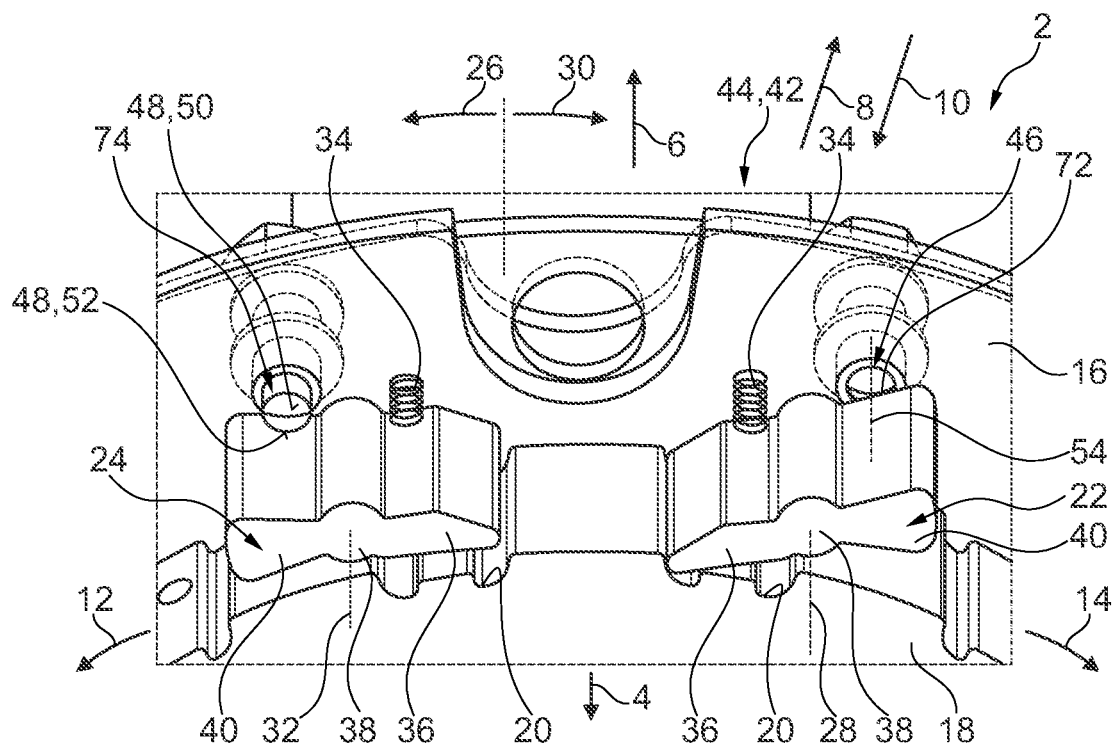

This application claims priority pursuant to 35 U.S.C. 119(a) to German Application No. 102022001398.3, filed Apr. 23, 2022, which application is incorporated herein by reference in its entirety.

BACKGROUND AND SUMMARY

The present invention relates to a pawl freewheel with a first race, a second race and pawls between the first and second race, which comprise at least one first pawl, which can be pivoted between a locked position in which the first race is rotationally drivingly coupled in a first direction of rotation relative to the second race via the first pawl to the second race, and an open position, in which the first race is rotatable in the first direction of rotation relative to the second race, wherein an actuating device is provided with an actuating pin which interacts with the first pawl and can be displaced from a first actuating position in which the first pawl is pivoted into the locked position, in the axial direction relative to the first pawl into a second actuating position, in which the first pawl is pivoted into the open position.

Pawl freewheels are known from the prior art, which have a first race, i.e., for example, an outer or inner ring, and a second race, i.e., for example, an inner or outer ring. Pivotable pawls are provided between the first and second race and are in rotational driving connection with one of the races. For example, if the pawl is in a rotational driving connection with the first race, it can be pivoted from an open position, in which the first race can be rotated in a first direction of rotation relative to the second race, into a locked position, in which the first race is rotationally drivingly coupled in the first direction of rotation via the pawl to the second race.

In addition, pawl freewheels of the generic type are known which have an actuating device for the targeted pivoting of the pawls. Actuation devices are known from practice, for example, which have an adjusting ring arranged on one of the races, wherein the adjusting ring can be rotated in the circumferential direction relative to the respective race in order to pivot at least one pawl between the locked position and the open position.

The known pawl freewheels with the rotatable actuating device have proven their worth, but their handling is sometimes difficult, and the known pawl freewheels have a relatively complex and space-intensive design, where a relatively high manufacturing cost is usually given.

It is therefore an object of the present invention to create a pawl freewheel with an actuating device for pivoting at least one of the pawls, which ensures easy handling, has a simple and compact design and leads to little wear on the actuating device and pawls, thereby increasing the service life and permanently ensuring the functionality.

This object is achieved by the features specified in patent claim 1. Advantageous embodiments of the invention are the subject matter of the dependent claims.

The pawl freewheel according to the invention has a first race and a second race. The first race can be, for example, an outer or inner ring, while the second race can be, for example, an inner or outer ring. Pawls are arranged between the first and second races, wherein these are preferably arranged in the radial direction between the first and second races. The pawls are preferably in a rotational driving connection with the first race, wherein the first race particularly preferably is an outer ring. Said pawls comprise at least one first pawl, wherein it is preferred if a plurality of first pawls of the type described in more detail below are provided. However, for example, all of the pawls may be formed of these first pawls, or only one of the pawls may be formed of the first pawl. The at least one first pawl can be pivoted between a locked position, in which the first race is rotationally drivingly coupled in a first direction of rotation relative to the second race, via the first pawl to the second race, and an open position, in which the first race can be pivoted in the first direction of rotation relative to the second race. The pivot axis preferably extends in the axial direction of the pawl freewheel. In the locking position of the at least one first pawl, a rotation of the first race in the first direction of rotation thus likewise causes a rotation of the second race in the first direction of rotation. In addition, the pawl freewheel has an actuating device for actuating or pivoting the at least one first pawl. The actuating device has an actuating pin which interacts with the first pawl, wherein the actuating pin preferably extends in the axial direction. The actuating pin can be displaced from a first actuating position, in which the first pawl is pivoted into the locked position, in the axial direction relative to the first pawl into a second actuating position, in which the first pawl is pivoted into the open position. In this case, it is preferred if the first pawl is pretensioned in its locked position. In order to bring about pivoting of the associated first pawl by displacing the actuating pin of the actuating device in the axial direction, the actuating pin has a face pointing in the axial direction, which is preferably designed as an end face, with an impinging surface which is inclined with respect to a radial plane and which can be supported or is supported directly on the first pawl by pivoting the first pawl. The pawl freewheel is characterized by its particularly easy handling when adjusting the first pawl, especially since the actuating pin simply has to be displaced in the axial direction. Since the actuating pin is also of particularly simple construction, in that its face has the impinging surface which is inclined with respect to the radial plane, a particularly simple manufacture, a simple construction and in particular a compact construction of the pawl freewheel are also achieved.

In order to be able to use a particularly small and space-saving actuating pin, the face of the actuating pin in a preferred embodiment of the pawl freewheel according to the invention also has a radial surface extending in the radial plane, to which the impinging surface optionally directly adjoins. Although the radial surface causes a shortening of the inclined impinging surface, the actuating pin does not unnecessarily protrude in the direction of the first pawl in its retracted position, so that a short displacement path of the actuating pin is ensured.

In order to enable a stronger pivoting movement even with a small travel of the actuating pin, despite the radial surface present on the face of the actuating pin, in a particularly preferred embodiment of the pawl freewheel according to the invention, the impinging surface has a larger surface area and/or a greater extent in the circumferential direction and radial direction than the radial surface of the face when viewing the face in the axial direction.

According to a further advantageous embodiment of the pawl freewheel according to the invention, a central axis of the actuating pin running or extending in the axial direction extends through the impinging surface. The central axis of the actuating pin is preferably the central axis of the second axial section of the actuating pin, which will be described in more detail later.

According to a further preferred embodiment of the pawl freewheel according to the invention, it has proven to be advantageous within the meaning of rapid activation and swift pivoting of the first pawl if the impinging surface is inclined at an angle between 25° and 55°, preferably between 30° and 50°, particularly preferably between 35° and 45°, with respect to the radial plane, optionally the radial surface of the face. The best results were achieved with an angle of inclination of the impinging surface with respect to the radial plane of approximately 40°.

In order to be able to use particularly space-saving actuating pins, the actuating pin in a further particularly advantageous embodiment of the pawl freewheel according to the invention has a front axial section, optionally an end section, in which the impinging surface extends, and a rear axial section following the front axial section. In this case, the impinging surface, optionally the entire face of the actuating pin, is preferably arranged completely flush with the rear axial section in the axial direction in order to create a particularly thin and space-saving pin. The front and the rear axial section preferably follow one another directly, wherein it is also preferred if the rear axial section merges continuously into the front axial section, wherein the transition to the inclined impinging surface is optionally the only exception here, which can certainly have a discontinuous course. In addition, it is preferred in this embodiment if the rear axial section has a circular cross section, and is therefore preferably of cylindrical design. The rear axial section is also preferably dimensioned such that the first pawl can be supported or is supported on the rear axial section of the actuating pin in the open position, when the actuating pin is in the second actuating position. This ensures secure support for the pawl pivoted into the open position. The support here is preferably in the radial direction of the pawl freewheel.

In order to keep wear and tear on the first pawl and the actuating pin minor, in a further particularly preferred embodiment of the pawl freewheel according to the invention the inclined impinging surface has a shape that deviates from a plane. An impinging surface that is curved in the direction of the first pawl has proven particularly advantageous here. A particularly minor level of wear and tear, and therefore lasting functionality and longevity of the pawl freewheel, has resulted in a preferred embodiment variant in which the impinging surface has a constant radius of curvature and/or is formed by a section of the casing of a circular cylinder. In this context, particularly large radii of curvature have proven to be advantageous, which are at least twice the radius of the aforementioned rear axial section. In particular, radii of curvature of absolutely 10 mm and more have led to increased durability and reliable functionality.

In a further advantageous embodiment of the pawl freewheel according to the invention, the actuating device has a plurality of actuating pins each assigned to a first pawl. It is preferred here if the movement of the actuating pins from the first to the second actuating position and vice versa are coupled to one another in order to be able to pivot two or more first pawls largely synchronously. The coupling of the movement of the actuating pins is preferably achieved via a common support part on which the actuating pins are arranged, optionally evenly distributed in the circumferential direction. In this context, a support part has proven to be particularly advantageous which is annular and which can be displaced in the axial direction for the purpose of displacing the actuating pins in the axial direction.

In a further advantageous embodiment of the pawl freewheel according to the invention, the impinging surface, preferably also the surface of the front axial section, particularly preferably also the surface of the rear axial section, is harder than the surface of at least one other section, optionally all other sections, of the actuating pin. In order to enable wear-free interaction with the pawl on the one hand and a simplified processing of the actuating pin, in particular attachment to the actuating device, on the other hand, the impinging surface, the surface of the front axial section and/or the surface of the rear axial section is preferably designed harder than the surface of a fastening section of the fastening pin following the rear axial section for fastening of the fastening pin to the aforementioned support part. This fastening section is particularly preferably deformed to form a fastening rivet and/or fastening flange for fastening to the supporting part. Viewed in the axial direction, the fastening section can in turn have larger dimensions than the rear axial section, especially since this is only used for fastening to the actuating device or the support part of the actuating device and does not interact directly with the pawl.

According to a further advantageous embodiment of the pawl freewheel according to the invention, the pawls also comprise at least one second pawl which is pivotable between a locked position in which the first race is rotationally drivingly coupled to the second race in a second direction of rotation opposite the first direction of rotation relative to the second race, via the second pawl, and an open position in which the first race can be rotated in the second direction of rotation relative to the second race. A second actuating device with a second actuating pin that interacts with the second pawl is provided, which can be displaced from a first actuating position, in which the second pawl is pivoted into the locked position, in the axial direction relative to the second pawl into a second actuating position in which the second pawl is pivoted into the open position. In this case, too, the second actuating pin has a face pointing in the axial direction with an impinging surface which is inclined with respect to a radial plane and which can be supported or is supported directly on the second pawl by pivoting the second pawl. With regard to the further structure of the second pawl and the second actuating pin assigned to the second pawl, reference is made to the previous statements and embodiment variants of the actuating device with the associated first pawl, which also apply in a corresponding manner to the second actuating device and the second pawls. Thanks to the second actuating device, a pawl freewheel is preferably created, which can be transferred into at least three shifting positions, one of which shifting positions has the effect that the first race cannot be rotated relative to the second race either in the first direction of rotation or in the second direction of rotation, especially since first and second pawl are each in the locked position. It can also be advantageous if the two actuating devices have a common support part on which both the actuating pins and the second actuating pins are arranged. In this way, the actuating pins can be displaced simultaneously with the support part, wherein the actuating pins and second actuating pins can be designed of different lengths in order to pivot the first and second pawls successively.

In a further advantageous embodiment of the pawl freewheel according to the invention, the first pawl and/or the second pawl is pretensioned in its locked position.

According to a further advantageous embodiment of the pawl freewheel according to the invention, the first pawl and the second pawl can be pivoted in mutually opposite pivoting directions into the open position and in mutually opposite pivoting directions into the locked position.

According to a further particularly preferred embodiment of the pawl freewheel according to the invention, the first pawl and/or the second pawl is rocker-shaped with an engagement section in front of a pivot axis for rotational driving engagement in the locked position and a rear section behind the pivot axis, wherein the associated actuating pin interacts with the rear section.

In a further advantageous embodiment of the pawl freewheel according to the invention, the impinging surface can be supported or is supported on an edge of the first pawl and/or the second pawl. The edge is preferably a side edge for delimiting the side surface of a pawl pointing in the axial direction.

According to a further advantageous embodiment of the pawl freewheel according to the invention, the impinging surface in the locked position is arranged flush with the edge of the first pawl and/or the second pawl in the axial direction in order to achieve the swiftest possible impingement on the edge via the impinging surface when the actuating pin is displaced.

BRIEF DESCRIPTION

Figure 2:
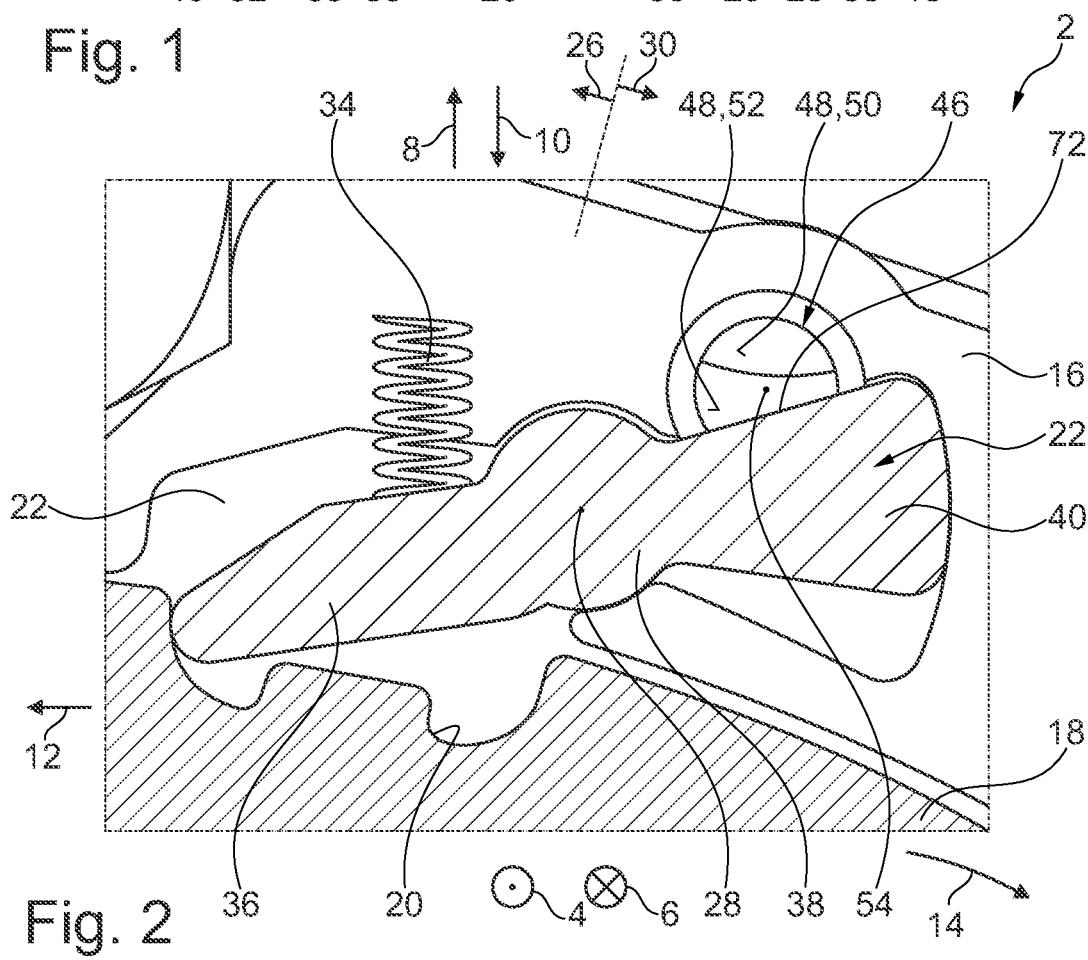
Figure 3:
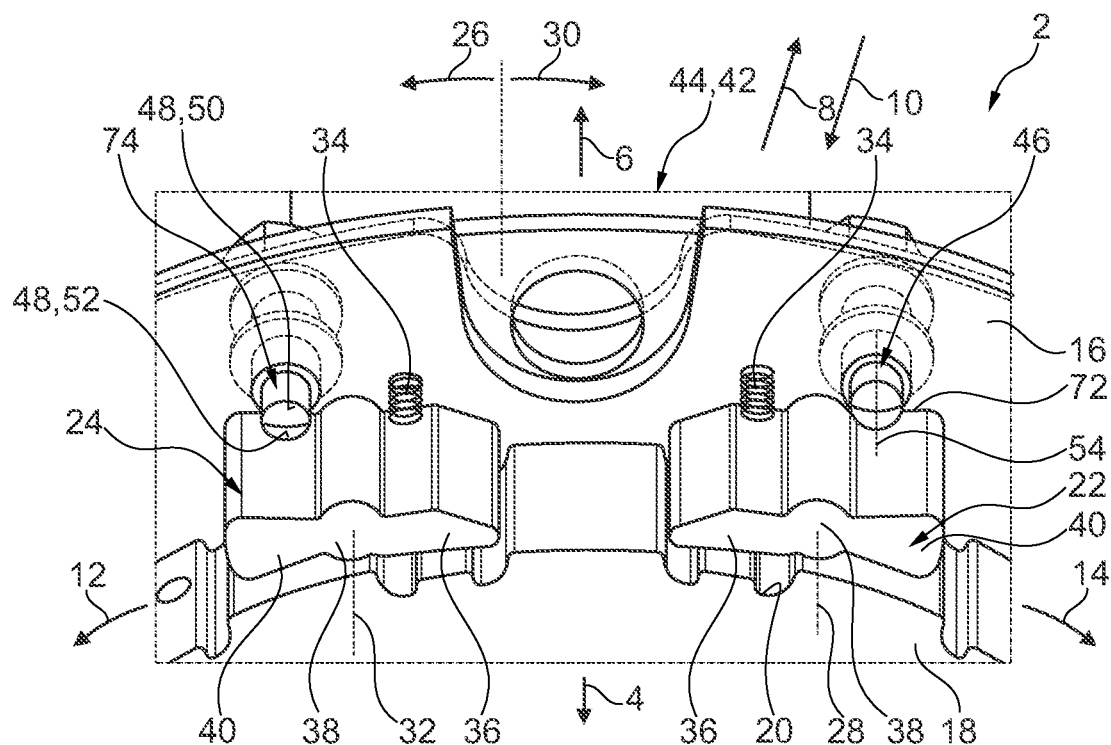
Figure 4:
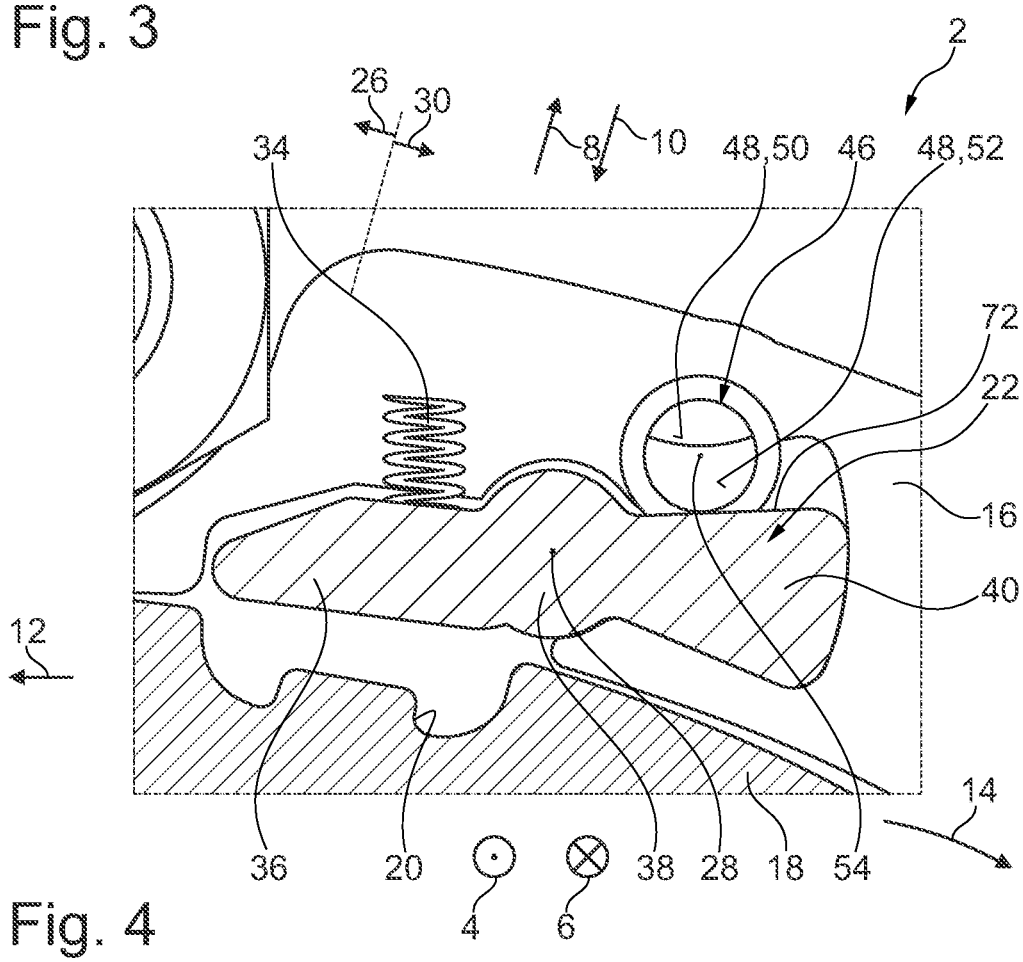
Figure 5:
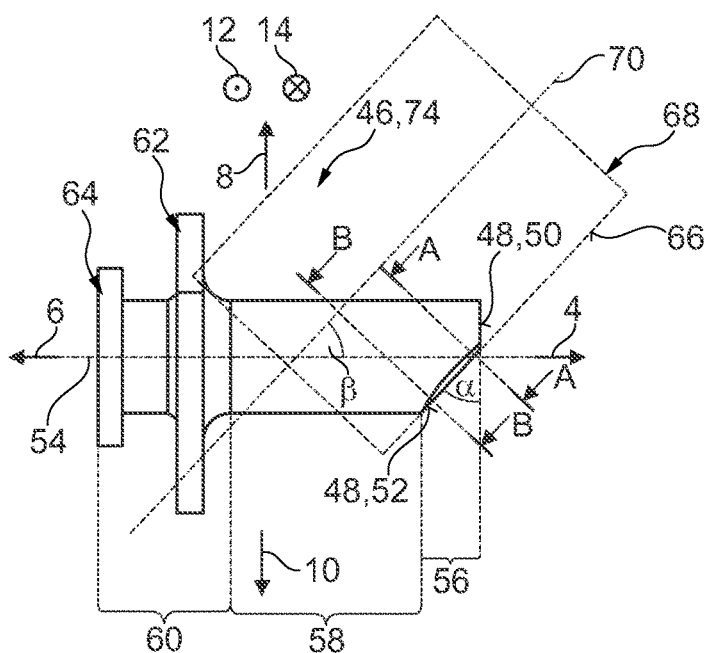
Figure 6:
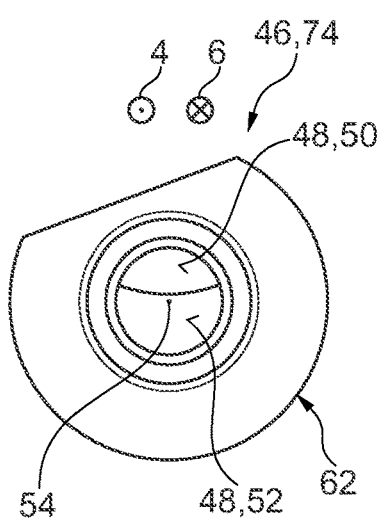
Figure 7:
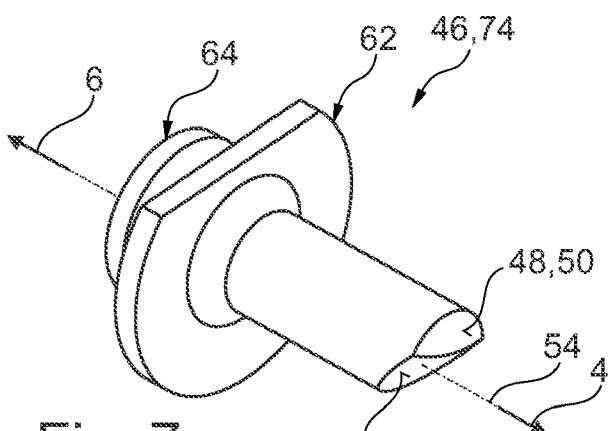
Figure 8:
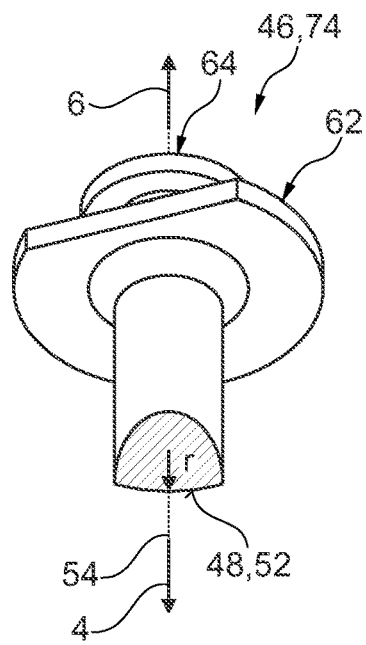
Figure 9:
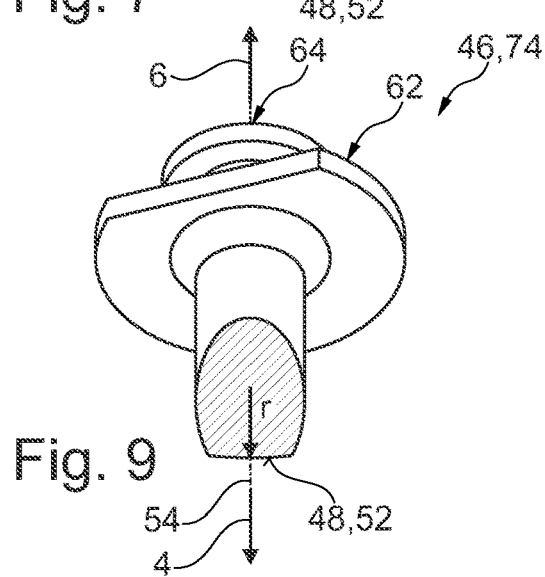

The invention is explained in more detail below using exemplary embodiments with reference to the attached drawings. In the following:

FIG. 1 shows a partial perspective view of a pawl freewheel with the first pawl in the locked position, FIG. 2 shows a side view of the first pawl in FIG. 1, FIG. 3 shows the pawl freewheel from FIG. 1 with the first pawl in the open position, FIG. 4 shows a side view of the first pawl in FIG. 1, FIG. 5 shows a side view of an actuating pin from FIGS. 1 to 4, FIG. 6 shows a front view of the actuating pin from FIG. 5, FIG. 7 shows a perspective view of the actuating pin from FIGS. 5 and 6, FIG. 8 shows the actuating pin from FIGS. 5 to 7 with a section along the section plane A-A in FIG. 5 and FIG. 9 shows the actuating pin from FIGS. 5 to 8 with a section along the section plane B-B in FIG. 5.

DETAILED DESCRIPTION

FIGS. 1 to 4 each show details of the pawl freewheel 2. In the Figures, the mutually opposite axial directions 4, 6, the mutually opposite radial directions 8, 10 and the mutually opposite circumferential directions 12, 14 of the pawl freewheel 2 are indicated by corresponding arrows.

The pawl freewheel 2 has a first race 16, which is designed here as the outer race 16 in the radial direction 8 and of which only the rear part is shown in the axial direction 6, and a second race 18, which is formed here as the inner race 18 in the radial direction 10 and is surrounded in the radial direction 8 on the outside by the first race 16. A rotational driving contour 20 is formed in the side of the second race 18 facing the first race 16 in the radial direction 8, while in the side of the first race 16 facing the second race 18 inwards in the radial direction 10 receptacles 22 for receiving the pawls described in more detail later are provided.

In the radial direction 8, 10 between the first and second race 16, 18 pawls are arranged within the receptacles 22, wherein first pawls 22 and second pawls 24 are arranged between the races 16, 18, which follow one another alternately in the circumferential direction 12, 14. The first pawls 22 can be pivoted between a locked position, which is shown in FIGS. 1 and 2, in which the first race 16 is rotationally drivingly coupled in a first direction of rotation 26 relative to the second race 18 via the first pawl 22 to the second race 18, about a pivot axis 28 into an open position and vice versa, which is shown in FIGS. 3 and 4 and in which the first race 16 can be rotated in the first rotational direction 26 relative to the second race 18.

Although the second pawl 24 is only shown in its open position in FIGS. 1 and 3, what was said for the first pawl 22 substantially applies accordingly. This means that the second pawl 24 can be pivoted between a locked position (not shown) in which the first race 16 is rotationally drivingly coupled in a second direction of rotation 30, opposite the first direction of rotation 26, relative to the second race 18 via the second pawl 24 to the second race 18, about a pivot axis 32 into an open position shown in FIGS. 1 and 3, in which the first race 16 can be rotated in the second direction of rotation 30 relative to the second race 18.

Both the first pawl 22 and the second pawl 24 are pretensioned into the respective locked position by means of a spring element 34 in each case. Furthermore, the first and second pawls 22, 24 can be pivoted in mutually opposite pivot directions about the respective pivot axis 28 or 32 into the open position and in mutually opposite pivot directions about the respective pivot axis 28 or 32 into the locked position. Moreover, the first and second pawls 22, 24 are rocker-shaped. Thus, the rocker-shaped pawls 22, 24 each have an engagement section 36 in front of a pivot axis section 38, in which the respective pivot axis 28, 32 is formed, and a rear section 40 behind the pivot axis section 38. The engagement section 36 is used for the rotational driving engagement in the rotational driving contour 20 of the second race 18 when the respective pawl 22 or 24 is in the locked position, while the rear section 40 of the rocker-like pawl 22 or 24 interacts with the actuating pin of the actuating device, which will be described in more detail later.

The first pawls 22 are assigned an actuating device 42, which is arranged in the axial direction 6 behind the first race 16 and has a plurality of actuating pins 46 arranged on an annularly formed support part 44—as shown in particular in FIGS. 5 to 7—wherein the actuating pins 46 extend in the axial direction 4 to the rear sections 40 of the first pawls 22. In this way, each first pawl 22 is assigned an actuating pin 46, whose movements in the axial direction 4, 6 are coupled to one another via the common annular support part 44, wherein the actuating pins 46 are distributed uniformly in the circumferential direction 12, 14 on the annular support part 44, which extends circumferentially in the circumferential directions 12, 14. Before the functioning of the actuating pins 46 is described in more detail, their construction should first be explained in more detail with reference to FIGS. 5 to 9.

The actuating pins 46 have a face 48 pointing in the axial direction 4, which has a radial surface 50 extending in a radial plane and an impinging surface 52 which is preferably directly adjacent to the radial surface 50. The impinging surface 52 is inclined with respect to the radial plane, i.e. also the radial surface 50 here. As can be seen in particular from FIG. 6, when viewing the face 48 in the axial direction 6, the impinging surface 52 has a larger surface area and a larger extent both in the circumferential direction 12, 14 and in the radial direction 8, 10 than the radial surface 50. Furthermore, it can be seen from FIGS. 5 to 6 that a central axis 54 of the actuating pin 46, which extends in the axial directions 4, 6, extends through the impinging surface 52 of the face 48. The central axis 54 is preferably the central axis of the cylindrically formed rear axial section of the actuating pin 46, as will be described later.

The impinging surface 52 is inclined at an angle α with respect to the radial plane, i.e. also the radial surface 50 here, which is between 25° and 55°, preferably between 30° and 50°, particularly preferably between 35° and 45°, wherein in the embodiment shown, a particularly advantageous angle α of 40° is shown.

As already indicated above, the actuating pin 46 has a front axial section 56, in which the impinging surface 52 and the radial surface 50 extend, so that the front axial section 56 can also be referred to as the end section of the actuating pin 46 pointing in the axial direction 4. In the axial direction 6, the front axial section 56 is immediately followed by a rear axial section 58 of the actuating pin 46, which is formed in one piece with the front axial section 56. The rear axial section 58 has a circular cross section, so that the rear axial section 58 is formed as a cylinder or circular cylinder. The impinging surface 52, more precisely the entire face 48, is arranged completely flush with the rear axial section 58 in the axial direction 4, 6. There is also no discontinuity or step between the rear axial section 58 and the front axial section 56 apart from the edge-shaped transition at the start of the impinging surface 52.

In the axial direction 6, the rear axial section 58 is followed by a fastening section 60 of the actuating pin 46, which serves to fasten the actuating pin 46 to the support part 44 of the actuating device 42. At least the impinging surface 52 is designed to be harder than the surface of another section of the actuating pin 46, namely in particular the surface of the fastening section 60. It is also advantageous if the surface of the front axial section 56 and/or the surface of the rear axial section 58 is designed harder than the surface of another section of the actuating pin 46, in particular the surface of the fastening section 60. The fastening section 60 is used for fastening to the support part 44 of the actuating device 42 by the fastening section 60 being deformed in order to produce a flange 62 and a fastening rivet 64, for example.

In the illustrated embodiment, the impinging surface 52 has a shape that deviates from a plane in a particularly advantageous manner. Specifically, the impinging surface 52 is curved in the axial direction 4, thus in the direction of the first pawl 22. In this case, the impinging surface 52 has a constant radius of curvature r, which is at least twice as large as the radius of the cross section of the rear axial section 58. The constant radius r of the impinging surface 52 can be seen in particular from FIGS. 8 and 9, of which FIG. 8 illustrates a section through the sectional plane A-A, while FIG. 9 illustrates a section through the sectional plane B-B running parallel to the sectional plane A-A. In the illustrated embodiment, an impinging surface 52 is shown even more precisely, which is formed by a section of the casing 66 of a circular cylinder 68 indicated by dashed lines in FIG. 5, whose opposite top surfaces have the radius of curvature r. The circular cylinder 68 has a longitudinal axis 70 which crosses the central axis 54 of the actuating pin 46 and extends in the radial direction 8 inclined at an angle β=90°— α.

The mode of operation of the actuating device 42 in connection with the first pawls 22 is first described below. In FIGS. 1 and 2, the actuating pins 46 are in a first actuating position which is set back in the axial direction 6 and in which the first pawl 22 is pivoted by the spring element 34 into the locked position. As can be seen in particular from FIG. 2, the impinging surface 52 of the face 48 is arranged flush with an edge 72 of the first pawl 22, more precisely the rear section 40 of the first pawl 22 in the axial direction 4, 6, wherein said edge 72 delimits a side surface of the first pawl 22.

If the actuating pins 46 are displaced in the axial direction 4 relative to the first pawl 22 into the second actuating position shown in FIGS. 3 and 4, then the impinging surface 52 is supported within the scope of this movement by pivoting the first pawl 22 from the position shown in FIGS. 1 and 2 into the open position shown in FIGS. 3 and 4 at the edge 72. The impinging surface 52 can be supported or is supported in a sliding manner on or along the edge 72 of the first pawl 22. As a result, the rear section 40 of the first pawl 22 is depressed in the radial direction 10 and the first pawl 22 is pivoted about the associated pivot axis 28 into the illustrated open position. In the open position, the first pawl 22 is preferably only supported on the rear axial section 58 against the pretensioning force of the spring element 34 in the radial direction 8 and is thus held securely in the open position.

As already explained above, the structure of a second actuating device for the second pawls 24 is corresponding, so that the previous statements regarding the actuating pins 46 apply to the second actuating pins 74 in a corresponding manner. The second actuating pins 74 thus interact with the second pawls 24, wherein the second actuating pins 74 are displaced from a first actuating position, in which the second pawl 24 is pivoted into the locked position, in the axial direction 4 relative to the second pawl 24 into a second actuating position, in which the second pawl 24 is pivoted into the open position, as shown in FIGS. 1 and 3. The second actuating pin 74 also has a face 48 pointing in the axial direction 4 with an impinging surface 52 which is inclined with respect to a radial plane and which can be supported or is supported directly on the second pawl 24 when the second pawl 24 pivots.

LIST OF REFERENCE NUMERALS 2 pawl freewheel
4 axial direction
6 axial direction
8 radial direction
10 radial direction
12 circumferential direction
14 circumferential direction
16 first race
18 second race
20 rotational driving contour
22 first pawl
24 second pawl
26 first direction of rotation
28 pivot axis
30 second direction of rotation
32 pivot axis
34 spring element
36 engagement section
38 pivot axis section
40 rear section
42 actuating device
44 support part
46 actuating pin
48 face
50 radial surface
52 impinging surface
54 central axis
56 front axial section
58 rear axial section 60 fastening section
62 flange
64 fastening rivet
66 casing
68 circular cylinder
70 longitudinal axis
72 edge
74 second actuating pin
α angle
β angle
r radius of curvature

The invention claimed is:

1. A pawl freewheel with a first race, a second race and pawls between the first and second race, which comprise at least one first pawl, which can be pivoted between a locked position, in which the first race is rotationally drivingly coupled in a first direction of rotation relative to the second race via the first pawl to the second race, and an open position, in which the first race is rotatable in the first direction of rotation relative to the second race,
wherein an actuating device is provided with an actuating pin which interacts with the first pawl and can be displaced from a first actuating position, in which the first pawl is pivoted into the locked position, in an axial direction relative to the first pawl, and into a second actuating position, in which the first pawl is pivoted into the open position,
wherein the actuating pin has a face pointing in an axial direction with an impinging surface which is inclined relative to a radial plane and which can be supported directly on the first pawl when the first pawl pivots, and
wherein the impinging surface has a shape that deviates from a plane and is curved in the direction of the first pawl.

2. The pawl freewheel according to claim 1, wherein the face has a radial surface extending in the radial plane to which the impinging surface directly adjoins.

3. The pawl freewheel according to claim 2, wherein the impinging surface has a larger surface area than the radial surface when viewing the face in the axial direction and a central axis of the actuating pin extending in the axial direction.

4. The pawl freewheel according to claim 2, wherein the impinging surface has a larger extent in the circumferential direction and radial direction than the radial surface when viewing the face in the axial direction and a central axis of the actuating pin extending in the axial direction.

5. The pawl freewheel according to claim 2, wherein the actuating pin extends through the impinging surface in the axial direction.

6. The pawl freewheel according to claim 1, wherein the impinging surface is inclined at an angle (α) of between 25° and 55° with respect to the radial plane.

7. The pawl freewheel according to claim 6, wherein the impinging surface is inclined at an angle (a) of between 30° and 50° with respect to the radial plane.

8. The pawl freewheel according to claim 6, wherein the impinging surface is inclined at an angle (a) of between 35° and 45° with respect to the radial plane.

9. The pawl freewheel according to claim 1, wherein the actuating pin has a front axial section, in which the impinging surface extends, and a rear axial section following the front axial section, wherein the impinging surface is arranged completely flush with the rear axial section in the axial direction and the rear axial section has a circular cross section.

10. The pawl freewheel according to claim 9, wherein an entire face of the impinging surface is arranged completely flush with the rear axial section in the axial direction.

11. The pawl freewheel according to claim 4, wherein the first pawl is supported on the rear axial section in the open position.

12. The pawl freewheel according to claim 1, wherein the impinging surface has a constant radius of curvature (r) and/or is formed by a section of a casing of a circular cylinder.

13. The pawl freewheel according to claim 12, wherein the radius of curvature (r) is at least twice as large as a radius of the rear axial section.

14. The pawl freewheel according to claim 1, wherein the actuating device has a plurality of actuating pins each assigned to the first pawl, wherein the movement of the actuating pins is coupled to one another via a common support part on which the actuating pins are arranged distributed uniformly in a circumferential direction.

15. The pawl freewheel according to claim 14, wherein the support part is annularly formed.

16. The pawl freewheel according to claim 1, wherein the impinging surface, the surface of a front axial section, and the surface of a rear axial section are formed harder than the surface of a fastening section of the actuating pin following the rear axial section for fastening the actuating pin to a support part.

17. The pawl freewheel according to claim 16, wherein the fastening section of the actuating pin is deformed to produce a fastening rivet for fastening to the support part.

18. The pawl freewheel according to claim 1, wherein the pawls further comprise at least one second pawl which can be pivoted between a locked position, in which the first race is rotationally drivingly coupled in a second direction of rotation opposite the first direction of rotation relative to the second race via the second pawl to the second race and an open position, in which the first race can be rotated in the second direction of rotation relative to the second race wherein a second actuating device is provided with a second actuating pin which interacts with the second pawl, which can be displaced from a first actuating position, in which the second pawl is pivoted into the locked position, in the axial direction relative to the second pawl into a second actuating position, in which the second pawl is pivoted into the open position, and the second actuating pin has a face pointing in the axial direction with an impinging surface inclined with respect to a radial plane, which can be supported or is supported directly on the second pawl when the second pawl pivots.

19. The pawl freewheel according to claim 1, wherein the first and/or second pawl is pretensioned into the locked position and/or can be pivoted in mutually opposite pivoting directions into the open position and locked position and/or is rocker-shaped with an engagement section in front of a pivot axis for rotational driving engagement in the locked position and a rear section behind the pivot axis is formed, which interacts with the actuating pin.

20. The pawl freewheel according to claim 1, wherein the impinging surface can be supported or is supported on an edge of the first and/or second pawl and/or is arranged flush with the edge in the axial direction in the locked position.

* * * * *